May 4, 1926.
C. O. HOWARD
DETACHABLE WHEEL HUB
Filed Oct. 2, 1925
1,583,043
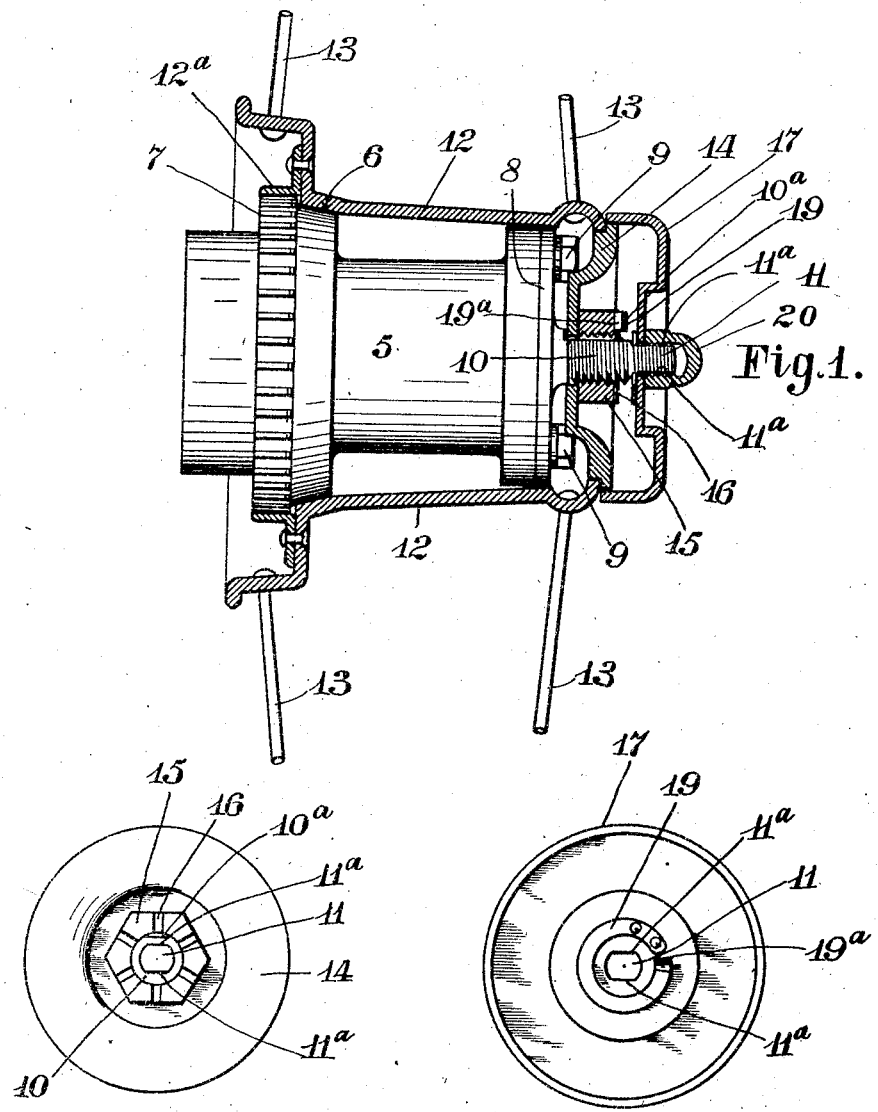
Inventor
CHARLES O. HOWARD
by Fincael Fincael
his Attorneys Patented May 4, 1926.

1,583,043

UNITED STATES PATENT OFFICE.

CHARLES O. HOWARD, OF COLUMBUS, OHIO, ASSIGNOR OF ONE-HALF TO THOMAS K. WISSINGER, OF COLUMBUS, OHIO.

DETACHABLE WHEEL HUB.

Application filed October 2, 1925. Serial No. 60,005.

*To all whom it may concern:*

Be it known that I, CHARLES O. HOWARD, a citizen of the United States, residing at Columbus, in the county of Franklin and State of Ohio, have invented a certain new and useful Improvement in Detachable Wheel Hubs, of which the following is a specification.

The invention is designed more especially for detachable wheels for motor vehicles. In many of such wheels there is a tendency of the wheel to become released from the axle or hub while driving, thus endangering the lives and limbs of the occupants of the vehicle and a large number of constructions have been proposed and patented with a view to preventing this. The object of the present invention is to provide an improved and simplified means adapted to securely lock the parts and resist said tendency, such means being readily manipulated either to apply or remove the wheel.

The invention is embodied in the example herein shown and described, the features of novelty being finally claimed.

In the accompanying drawing—

Figure 1 is a view partly in axial section and partly in full lines showing the invention.

Fig. 2 is an elevation of the outer end of the removable hub retainer plate, the hub cap being removed.

Fig. 3 is an elevation of the inner side of the outer hub cap showing the nut latching member thereon.

In the views 5 designates the inner or permanent hub which has the periphery of its inner end provided with a guiding flare portion 6 leading to a toothed portion 7; and its outer end provided with a disk 8 bolted thereto by bolts 9. The disk 8 is provided with a central stem of two different diameters, as at 10 and 11, the portion of larger diameter 10 being threaded and flattened on one side as at 10ª to make it non-circular the portion 11 also being threaded and flattened at 11ª on opposite sides to make it non-circular.

The character 12 designates outer or removable hub part, it carrying the spokes 13 of the wheel as usual. The outer hub part 12 has riveted to it a flanged ring 12ª provided with teeth to engage the toothed portion 7 of the permanent hub to prevent the removable hub part from rotating on the permanent hub part after the removable hub has been shoved on to the permanent hub part with said teeth engaged.

The character 14 designates a retainer plate which is provided centrally with a hole to fit on the larger stem portion 10 so as to cause the plate to rotate therewith. The rim of said plate 14 has a rabbet to fit against and close the outer end of the removable hub part, said plate being held in this position by a large threaded nut 15 turned onto the larger portion 10 of the threaded stem. The nut 15 is provided with radial grooves or notches 16 in its outer face.

The hub cap, designated 17, has a cupped rim that fits over the exposed rim of the plate 14 said cap being provided with a central orifice conforming to the flattened portion of the smaller portion 11 of the stem so as to rotate therewith. The inner side of said cap 14 has secured to it one end of a circular compressible spring 19 lying around said orifice the free end of said spring being bent to form a tooth 19ª to engage one of the radial grooves 16 of the nut 15 when the hub cap is properly pressed home on the small threaded portion 11 of the stem. When the hub cap 17 is so pressed home it is held in that position by means of a cap nut 20 threaded onto the outer end of said threaded portion 11.

To detach the wheel from the permanent hub the cap nut, the cap, the large nut and the retainer plate are removed in the order named after which the outer hub is easily slipped off it being assumed, of course, that the car is "jacked up" to raise the wheel from contact with the ground. To place the wheel on the permanent hub the recited parts are applied in reverse order.

It will be observed therefore that the principal members securing the outer hub part to the inner hub part is the plate 14 and the large nut 15. The spring latch 19 of the hub cap prevents said nut from turning off or turning more than a fraction of the distance between two of the radial grooves 16 because the two caps are in fixed relation to each other and to the permanent hub as well as the outer or removable hub.

If the cap and the small nut securing it should accidentally come off the large nut will function perhaps permanently but certainly for a sufficient period to render it evident to the driver that something is wrong with the wheel and that the same needs attention thereby leading to the discovery of the absence or loss of the outer nut or of both it and the cap.

My invention is applicable interchangeably to all four of the permanent hub parts of a motor vehicle, said permanent hub parts on the rear axle usually having driving means suitably connected with them as well understood.

The forms of the parts can be changed without departing from the invention as claimed.

What I claim is:

1. In means of the kind described, a permanent hub part having a threaded stem, a removable hub part, members securing the removable hub part to the permanent hub part including a nut turned on said stem, a hub cap and a latching member between the hub cap and nut to latch said nut when said cap is secured on the permanent hub part.

2. In means of the kind described, a permanent hub part having a threaded stem, a removable hub part, members securing the removable hub part to the permanent hub part including a retainer plate connected with the permanent hub and engaging the removable hub part and a nut on said stem, a hub cap and a latching member carried thereby to engage the nut when said cap is secured on the permanent hub part.

3. In means of the kind described, a permanent hub part having a threaded stem, a removable hub part, members securing the removable hub part to the permanent hub part including a retainer plate and a grooved nut turned on said stem, a hub cap and a compressible latching member carried thereby to engage the said grooved nut when said hub cap is secured on the permanent hub part.

4. In means of the kind described, a permanent hub part having a threaded stem, a removable hub part non-rotatively engaged with the permanent hub part, a retainer plate in non-rotative engagement with said stem and removable hub part, a nut threaded on said stem and securing said plate to the permanent hub part, a hub cap also in engagement with said permanent hub part, a nut latching member between said hub cap and nut to latch said nut from rotation, and means for securing said hub cap in nut latching position.

5. In means of the kind described, a permanent hub part provided with a threaded stem, a removable hub part and means for connecting said hub parts to cause them to rotate together, means for holding the removable hub part from axial movement off the permanent hub part including a threaded member on said threaded stem, a hub cap, latching means between the hub cap and said threaded member to hold the threaded member from rotation on the stem and means for retaining the hub cap in threaded member holding position.

6. In means of the kind described, a permanent hub part having a removable head provided with a threaded stem, a removable hub part and means for connecting said hub parts to cause them to rotate together, means for holding the removable hub part from axial movement off the permanent hub part including a threaded member on said threaded stem, a hub cap, latching means between the hub cap and said threaded member to hold the threaded member from rotation on the stem, and means for retaining the hub cap in threaded member holding position.

7. In means of the kind described, a permanent rotary hub provided with a threaded stem rotating therewith, said threaded stem having a non-circular portion, a removable hub part on said permanent hub part and means connecting said hub parts to cause them to rotate together, a retainer plate for the removable hub part having a non-circular opening engaging the non-circular portion of the threaded stem to cause it to rotate with the two hub parts, and a nut on said threaded stem to hold the retainer plate in position to prevent the accidental removal of the removable hub part from the permanent hub part in the axial direction.

8. In means of the kind described, a permanent rotary hub part having a threaded stem provided with a non-circular portion, a removable hub part non-rotatively engaged with a permanent hub part but removable axially therefrom, a retainer plate for the removable hub in non-rotative engagement with the non-circular portion of said stem, and a nut threaded on said stem securing said retainer plate in position to resist accidental release of the removable hub part in the axial direction.

CHARLES O. HOWARD.